United States Patent [19]

Maguire

[11] 4,152,031

[45] May 1, 1979

[54] TRACK ROLLER WITH OIL FILTER

[75] Inventor: Roy L. Maguire, Edelstein, Ill.

[73] Assignee: Caterpillar Tractor Co., Peoria, Ill.

[21] Appl. No.: 827,505

[22] Filed: Aug. 25, 1977

[51] Int. Cl.² .................................................. F16C 13/02
[52] U.S. Cl. ..................................... 305/14; 184/6.24;
308/104
[58] Field of Search ................. 308/18, 95, 101–104;
305/14, 28; 184/6.24

[56] References Cited

U.S. PATENT DOCUMENTS

| | | | |
|---|---|---|---|
| 421,382 | 2/1890 | Caldwell | 308/104 |
| 671,847 | 4/1901 | White | 308/104 |
| 891,060 | 6/1908 | Hammett | 308/104 |
| 2,237,921 | 4/1941 | Baker et al. | 308/103 |
| 2,331,119 | 10/1943 | Gouldbourn et al. | 184/6.24 |
| 2,926,968 | 3/1960 | Toth | 308/18 X |
| 3,910,128 | 10/1975 | Boggs et al. | 305/28 X |
| 3,945,693 | 3/1976 | Booth et al. | 305/14 X |
| 4,030,178 | 6/1977 | Luebkemann | 308/103 X |

*Primary Examiner*—David H. Brown
*Attorney, Agent, or Firm*—Wegner, Stellman, McCord, Wiles & Wood

[57] ABSTRACT

An improved tractor roller or idler assembly for a track-type tractor. A stationary shaft is secured to the major or minor bogie. The shaft has an internal cavity which retains a supply of lubricating oil. Radially extending passageways are projected through the stationary shaft to its exterior surface. Sleeve bearings rotate on the shaft and enhance rotation of the roller or idler. Lubricating oil is permitted to flow through the radially projecting passageways to lubricate the sleeve bearings. A filter, disposed within the radially extending passageways and extending into the internal cavity, assures that harmful contaminants in the lubricating oil do not reach or interfere with the sleeve bearings.

2 Claims, 6 Drawing Figures

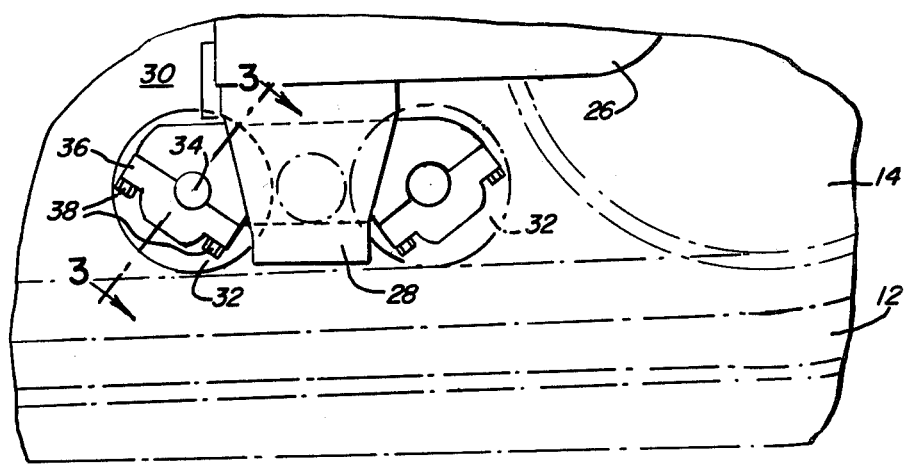
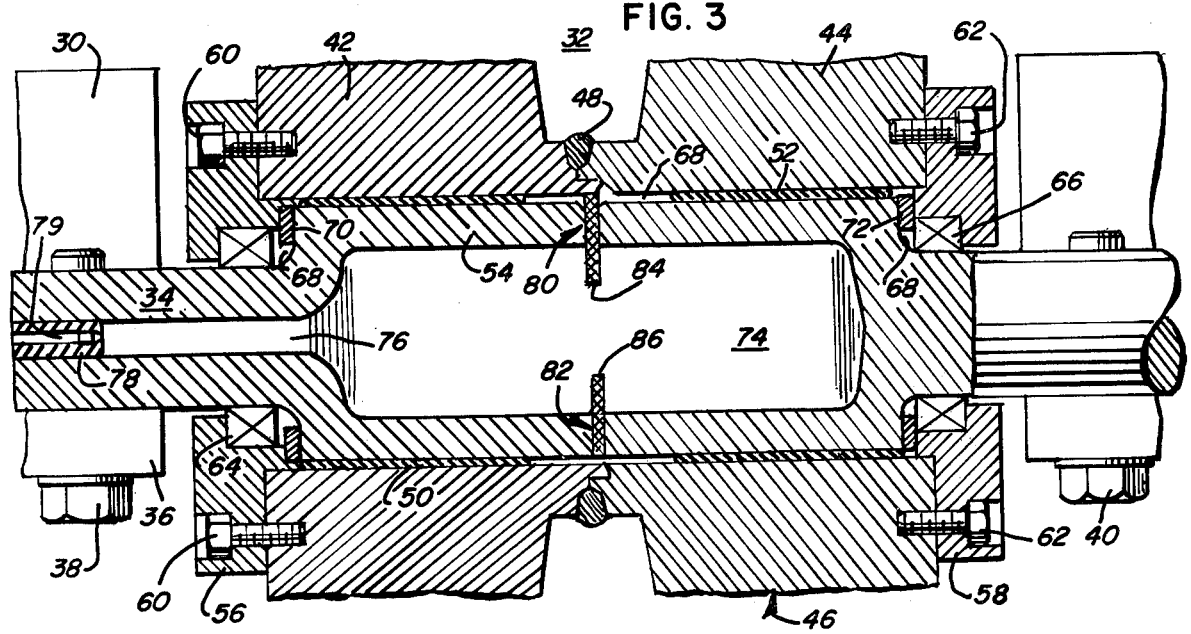

TRACK ROLLER WITH OIL FILTER

BACKGROUND OF THE INVENTION

This invention relates to an improved large shaft track roller or idler assembly for a track-type tractor and, more particularly, to an enlarged stationary hollow shaft structure which provides greater load capacity as a result of a larger projected bearing area.

Large shaft rollers and idlers which rotate about a fixed shaft have a significant advantage over rollers and idlers which have an integral rotatable shaft and which are journaled between two rails. However, it has been difficult to obtain a reliable means for lubricating the bearings between the stationary shaft and the rotating roller or idler in large, track-type tractors. Because of this difficulty, some track-type tractors have an integral shaft which rotates as the roller or idler rotates. Luebkemann U.S. Pat. No. 3,955,646, issued May 11, 1976, is an example of a rotatable shaft and roller assembly. Luebkemann fills a hollow cavity in the roller with a plastic open cell foam which immobilizes contaminants and holds a lubricating oil within the open cells. As the roller rotates, the lubricant is released from the open cells to provide the necessary lubrication between the roller and the track frame. Unfortunately, Luebkemann's teachings do not apply to stationary shaft assemblies since he requires rotation to effect the appropriate lubrication of the bearings.

I have solved the problem of providing a reliable means of lubrication to the bearings and have developed an improved stationary shaft roller assembly for a roller or idler which has a greater load capacity than heretofore available.

SUMMARY OF THE INVENTION

The present invention is directed to overcoming one or more of the problems as set forth above.

According to the present invention, a large stationary shaft having an internal cavity therein is formed from a single extrusion or from two similar forgings or castings welded at their ends. The internal cavity retains a supply of lubricating oil therein. The lubricating oil is permitted to flow through small radially projecting passageways to lubricate sleeve bearings located between the stationary shaft and the rotatable element. A filter disposed within each radially extending passageway extends into the internal cavity to assure that harmful contaminants in the lubricating oil, such as debris remaining from the welding process, do not reach and interfere with the bearings.

BRIEF DESCRIPTION OF THE DRAWINGS

FIG. 2 is a detailed view of a track roller and idler assembly shown in FIG. 1;

FIG. 3 is a cross-sectional view of a track roller taken along lines 3—3 of FIG. 2;

FIG. 4 is a perspective view of a filter which is dispposed in the stationary shaft to filter the lubricating oil; and FIGS. 5a and 5b shows two alternative cross-sectional configurations of forgings or castings which are welded together to provide the stationary shaft.

DESCRIPTION OF THE PREFERRED EMBODIMENT

Figure 1:
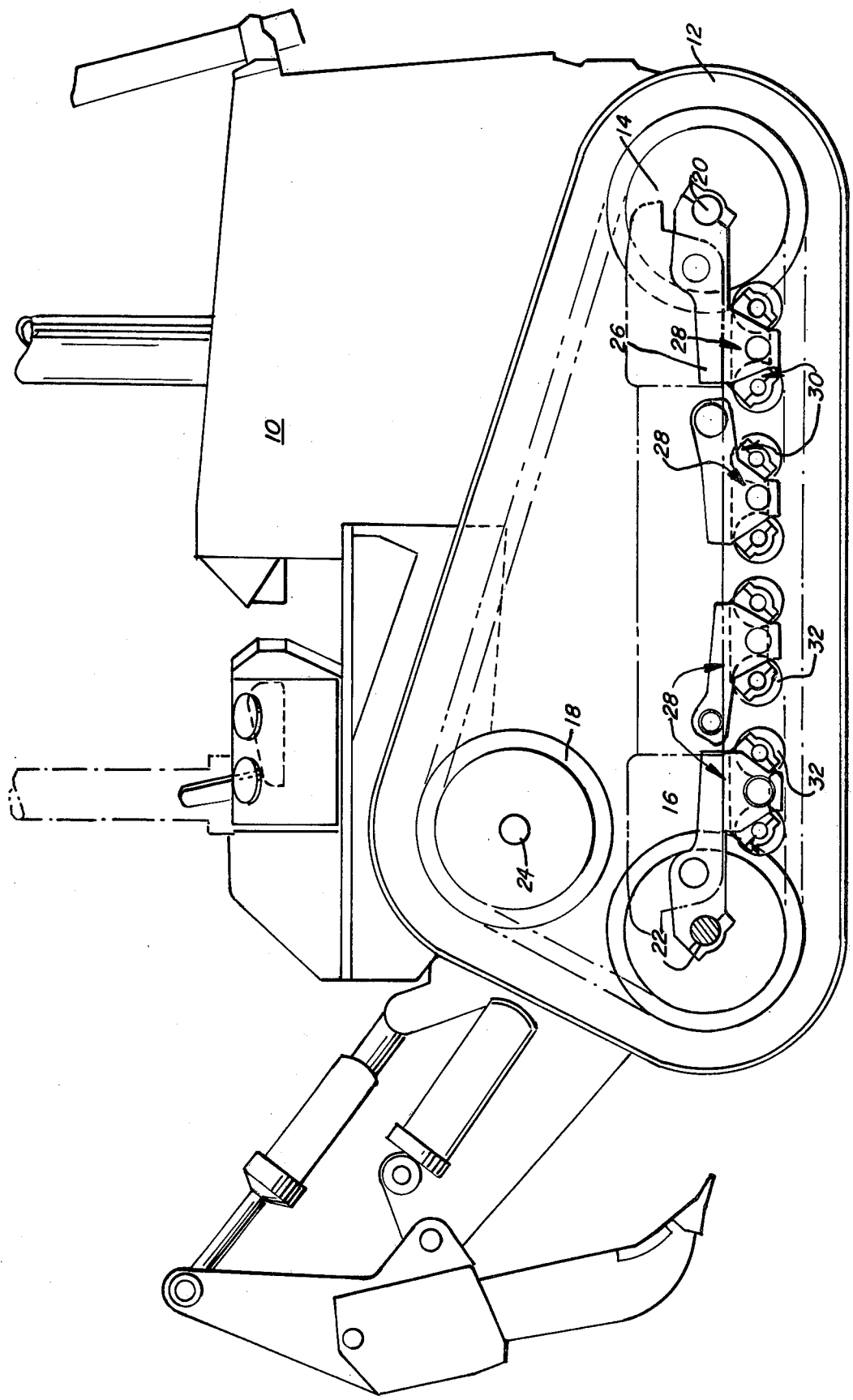
FIG. 1 depicts a typical track-type tractor having the improved stationary shaft track roller and idler assemblies.

Referring to FIG. 1, track-type tractor 10 is shown with the improved roller and idler assemblies in accordance with the present invention. Tractor 10 has a pair of endless tracks, as track 12, parallel to each other providing for controlled movement of tractor 10 in the well known manner. The track traverses idler assemblies 14 and 16 and drive assembly 18, which are rotatably mounted on shafts 20, 22 and 24, respectively.

Shaft 20 is secured to a major bogie, as major bogie 26. A plurality of roller assemblies, as roller assembly 28, located between idler assembly 14 and idler assembly 16 are secured to the minor bogies, as minor bogie 30. Each roller assembly 28 has two track rollers 32. The roller assemblies 28 guide the track 12 while the track 12 is in its ground-engaging position. The track-type tractor 10 shown in FIG. 1 with the improved idler and roller assemblies is one of the larger tractors manufactured by Caterpillar Tractor Co., the assignee of the present invention. Although the improved assemblies are particularly useful with the larger track-type equipment, it is not limited thereto. In fact, the improved idler and roller assemblies of this invention would be advantageous to all types of track-type vehicles.

FIG. 2 shows the detail of the track 12, idler assembly 14, major bogie 26, roller assembly 28 and minor bogie 30. For the purpose of brevity, only the construction of one track roller 32 and mounting, as part of the roller assembly 28, will be explained. However, the discussion applies equally to the other rollers 32 and to the other roller assemblies 28 and to the construction of the idler assembly 14.

Referring to FIG. 3, shaft 34 is securely attached to minor bogie 30 by suitable clamping means such as a bearing block 36 and bolts 38 and 40. Shaft 34 is nonrotatable and is of a single extrusion. Track roller 32, constructed of two substantially similar halves 42 and 44, is rotatable about shaft 34. The halves 42 and 44 are secured at weld 48 and their outer surface 46 is shaped to receive track 12. Sleeve bearings 50 and 52 engage the expanded center portion 54 of shaft 34 and are interposed between shaft 34 and track roller 32 to enhance rotation. Retaining rings 56 and 58 are secured to the ends of track roller 32 by screws 60 and 62, respectively. Retaining rings 56 and 58 are provided with seals 64 and 66 to retain a lubricant within the closed spaces 68 between the seals 64,66 and the ends of the expanded center portion 54 of the shaft and between the outer surface of said center portion 54 and the inner surface of the roller 32, as will be explained in greater detail below. Thrust washers 70 and 72 are positioned between the rings 56,58 and the expanded center portion 54 to restrain translational movement of track roller 32 with respect to shaft 34.

Shaft 34 has an internal cavity 74 in the expanded center portion 54 for retaining a quantity of lubricating oil. The cavity 74 is in communication with a bore 76 which provides an inlet for the oil. Resilient plug 78, having a small annular hole 79 in its center, is inserted in bore 76 so that the cavity 74 can be refilled when necessary. Radially extending bores 80 and 82 provide passageways for the oil from internal cavity 74 to cavity 68 for the proper lubrication of bearings 50 and 52. Similar filter screens 84 and 86, one of which is shown enlarged in FIG. 4, are inserted within bores 80 and 82 and extend into internal cavity 74 a distance sufficient to assure that contaminants, particles and debris within internal cavity 74 will collect on the surface of the screens and will not clog the entrances to the bores 80 and 82. The filter screens 84 and 86 may be press-fitted into bores 80 and 82, and may be removed or replaced if desired. It is to be understood that one passageway, as passageway 80 or 82, may be adequate under certain conditions and yet three or more may be required under other conditions, all within the scope of the present invention.

The filter screens assure that contaminants, debris and particles of a size sufficient to cause damage to bearings 50 and 52 will be retained within the internal cavity 74. This is especially important if shaft 34 is constructed from two similar forgings or castings 88 and 90 welded together at their ends to form internal cavity 74 instead of being a single extrusion. As best shown in FIG. 5a, castings 88 and 90 are secured together at their ends by friction weld 92 or by arc weld 94 as shown in FIG. 5b. In either case, the weld creates contaminants, particles and debris within internal cavity 74 which must be prevented from interfering with bearings 50 and 52. The fineness of the screen material is selected such that any particles which pass therethrough are so small that they do not cause damage to bearings 50 and 52 if they become embedded therein.

The embodiments of the invention in which an exclusive property or privilege is claimed are defined as follows:

1. An improved tractor roller or idler assembly for a track-type tractor comprising:
   a stationary shaft;
   an internal cavity within the shaft;
   inlet means through which lubricating oil is added to the internal cavity;
   passageways of substantially circular cross section extending from the internal cavity to the exterior surface of the shaft;
   a rotatable element on the shaft defining an annular cavity between the rotatable element and the exterior surface of the shaft;
   sealing means extending between the rotatable element and the shaft to preclude oil flow from the annular cavity;
   bearing means mounted within the rotatable element, said bearing means located between the rotatable element and the shaft and within the annular cavity;
   oil filter means disposed within each passageway and extending into the internal cavity; and
   said filter means is a screen-like material having a tubular form pressfit within the passageways.

2. The improved tractor roller or idler assembly of claim 1 wherein the filter means is sufficiently fine to filter welding splatter and debris.

* * * * *